United States Patent
Shaikh et al.

(10) Patent No.: US 11,496,713 B2
(45) Date of Patent: Nov. 8, 2022

(54) SYSTEMS AND METHOD FOR MANAGING REMOTE DISPLAY OF VIDEO STREAMS

(71) Applicant: Eaton Intelligent Power Limited, Dublin (IE)

(72) Inventors: Alfurqan Shaikh, Maharashtra (IN); Birger Kollstrand, His (NO)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 17/061,769

(22) Filed: Oct. 2, 2020

(65) Prior Publication Data
US 2021/0105439 A1   Apr. 8, 2021

Related U.S. Application Data

(60) Provisional application No. 62/912,114, filed on Oct. 8, 2019.

(51) Int. Cl.
*H04N 7/18*   (2006.01)
*H04N 5/232*   (2006.01)
(Continued)

(52) U.S. Cl.
CPC ............ *H04N 7/181* (2013.01); *H04L 65/65* (2022.05); *H04N 5/23206* (2013.01); *G06F 13/385* (2013.01)

(58) Field of Classification Search
None
See application file for complete search history.

(56) References Cited

U.S. PATENT DOCUMENTS 10,523,979 B2 * 12/2019 Dharmaji ............ H04N 21/2187
11,032,136 B2 * 6/2021 Karivaradaswamy ......................
                                                                G06F 9/4413
(Continued)

FOREIGN PATENT DOCUMENTS

| CN | 105704453 A | 6/2016 |
|---|---|---|
| CN | 110336781 A | * 10/2019 |
| WO | 0221414 A1 | 3/2002 |

OTHER PUBLICATIONS

European International Searching Authority, International Search Report and Written Opinion, dated Jan. 29, 2021, pp. 12.

(Continued)

*Primary Examiner* — Shadan E Haghani
(74) *Attorney, Agent, or Firm* — Talem IP Law, LLP

(57) ABSTRACT

Systems and methods for provisioning remote display of video streams. For instance, the system includes video cameras, monitoring devices and provisioning server(s). Each video monitoring device includes a client device and a display. The provisioning server is configured to: discover the video cameras by receiving discovery requests; register the video cameras, the registering including storing real time streaming protocol (RTSP) information in the provisioning database; discover the video monitoring devices by receiving discovery requests; register the video monitoring devices, the registering including storing display capabilities in the provisioning database; provide a provisioning portal, the provisioning portal including a graphical user interface for receiving provisioning instructions including assignments of the video cameras to the video monitoring devices, where the provisioning portal stores the received provisioning instructions in the provisioning database; and reconfig- (Continued)

ure, responsive to the received provisioning instructions, the video monitoring devices to display outputs of selected cameras on the display.

16 Claims, 6 Drawing Sheets

(51) Int. Cl.
*H04L 65/65* (2022.01)
*G06F 13/38* (2006.01)

(56) References Cited

U.S. PATENT DOCUMENTS

| | | | |
|---|---|---|---|
| 2012/0113265 A1* | 5/2012 | Galvin | H04N 5/23206 348/159 |
| 2014/0047143 A1* | 2/2014 | Bateman | H04L 65/1069 710/72 |
| 2016/0087933 A1 | 3/2016 | Johnson | |
| 2016/0352798 A1* | 12/2016 | Becker | H04L 65/60 |
| 2016/0366319 A1 | 12/2016 | Perkins | |
| 2018/0184049 A1* | 6/2018 | Moss | H04N 7/181 |
| 2018/0357681 A1 | 12/2018 | Sullivan | |

OTHER PUBLICATIONS

"OMXPlayer: An accelerated command line media player" Retrieved on Sep. 17, 2019, Retrieved from: https://www.raspberrypi.org/documentation/raspbian/applications/omxplayer.md, 4 pages.

"Passwordless SSH Access" Retrieved on Sep. 17, 2019, 3 pages.

"Remote Access: Introduction to Remote Access" Retrieved on Apr. 4, 2022, Retrieved from: https://www.raspberrypi.org/documentation/remote-access/ssh/passwordless.md, 50 pages.

"Raspberry Pi OS" Retrieved on Apr. 4, 2022, Retrieved from: https://www.raspberrypi.com/software, 6 pages.

* cited by examiner

SYSTEMS AND METHOD FOR MANAGING REMOTE DISPLAY OF VIDEO STREAMS

CROSS-REFERENCE TO RELATED APPLICATION(S)

This application claims priority to U.S. Provisional Patent Application Ser. No. 62/912,114, filed Oct. 8, 2019, and which is incorporated herein by reference in its entirety.

BACKGROUND

In a large facility, numerous video cameras may be deployed for monitoring equipment, providing general purpose security, or other such purposes. The systems may include large numbers of cameras and video displays. When the number and complexity of a deployment increases, difficulties arise in managing, upgrading or provisioning these systems.

For example, conventional systems rely on a client computer or device that includes a human machine interface (HMI) for logging in, configuring, and using the client computer or device to display video streams, e.g., by outputting those video streams to attached monitors. The HMI is used for manual configuration, one at time, of client devices when deployed in a system.

SUMMARY

In one embodiment, a system for provisioning remote display of video streams is presented. The system includes a plurality of video cameras, a plurality of video monitoring devices and a provisioning server. Each video camera of the plurality of video cameras is configured to send discovery requests and receive configuration requests. Each video monitoring device includes a client device and at least one display. The client device is configured to send discovery requests and receive configuration requests. The provisioning server is configured to: discover the plurality of video cameras by receiving the discovery requests from the plurality of video cameras; register the plurality of video cameras, the registering including storing real time streaming protocol (RTSP) information of the plurality of video cameras in the provisioning database; discover the plurality of video monitoring devices by receiving the discovery requests from the client device of each video monitoring device; register the plurality of video monitoring devices, the registering including storing display capabilities of the plurality of video monitoring devices in the provisioning database; provide a provisioning portal, the provisioning portal including a graphical user interface for receiving provisioning instructions including assignments of the plurality of video cameras to the plurality of video monitoring devices, where the provisioning portal stores the received provisioning instructions in the provisioning database; and reconfigure, responsive to the received provisioning instructions, the plurality of video monitoring devices to display outputs of selected cameras of the plurality of cameras on the at least one display of each of the plurality of video monitoring devices.

In another embodiment, a system for provisioning remote display of video streams is presented. The system includes a plurality of video cameras, a plurality of video monitoring devices and a provisioning server. Each video camera of the plurality of video cameras is configured to send discovery requests and receive configuration requests. Each video monitoring device includes a client device and at least one display. The client device includes a hardware accelerated component to display one or more video streams and is configured to send discovery requests and receive configuration requests. The plurality of video monitoring devices do not include a human-machine interface. The provisioning server includes a provisioning database. The provisioning server is configured to: discover the plurality of video cameras by receiving the discovery requests from the plurality of video cameras; register the plurality of video cameras, the registering including storing real time streaming protocol (RTSP) information of the plurality of video cameras in the provisioning database; communicate with the plurality of video monitoring devices using public and private encryption keys; discover the plurality of video monitoring devices by receiving the discovery requests from the client device of each video monitoring device; register the plurality of video monitoring devices, the registering including storing display capabilities of the plurality of video monitoring devices in the provisioning database and using a license file stored in the provisioning database; provide a provisioning portal, the provisioning portal including a graphical user interface for receiving provisioning instructions including assignments of the plurality of video cameras to the plurality of video monitoring devices, where the provisioning portal stores the received provisioning instructions in the provisioning database; reconfigure, responsive to the received provisioning instructions, the plurality of video monitoring devices to display outputs of selected cameras of the plurality of cameras on the at least one display of each of the plurality of video monitoring devices, the reconfiguring including sending extensible markup language (XML) instructions to the plurality of video monitoring devices; and upgrade software of each of the plurality of video monitoring devices.

In a further embodiment, a method for provisioning remote display of video streams using a plurality of video cameras and a plurality of video monitoring devices is presented. Each video monitoring device includes a client device and at least one display. The method includes: discovering the plurality of video cameras by receiving discovery requests from the plurality of video cameras; registering the plurality of video cameras, the registering including storing real time streaming protocol (RTSP) information of the plurality of video cameras in a provisioning database; discovering the plurality of video monitoring devices by receiving discovery requests from the client device of each video monitoring device; registering the plurality of video monitoring devices, the registering including storing display capabilities of the plurality of video monitoring devices in the provisioning database; providing a provisioning portal, the provisioning portal including a graphical user interface; receiving, via the provisioning portal, provisioning instructions including assignments of the plurality of video cameras to the plurality of video monitoring devices; storing the received provisioning instructions in the provisioning database; and reconfiguring, responsive to the received provisioning instructions, the plurality of video monitoring devices to display outputs of selected cameras of the plurality of cameras on the at least one display of each of the plurality of video monitoring devices.

The above embodiments are exemplary only. Other embodiments are within the scope of the disclosed subject matter.

BRIEF DESCRIPTION OF THE SEVERAL VIEWS OF THE DRAWINGS

Example embodiments are illustrated by way of example and not limitation in the figures of accompanying drawings, in which.

Figure 1A:
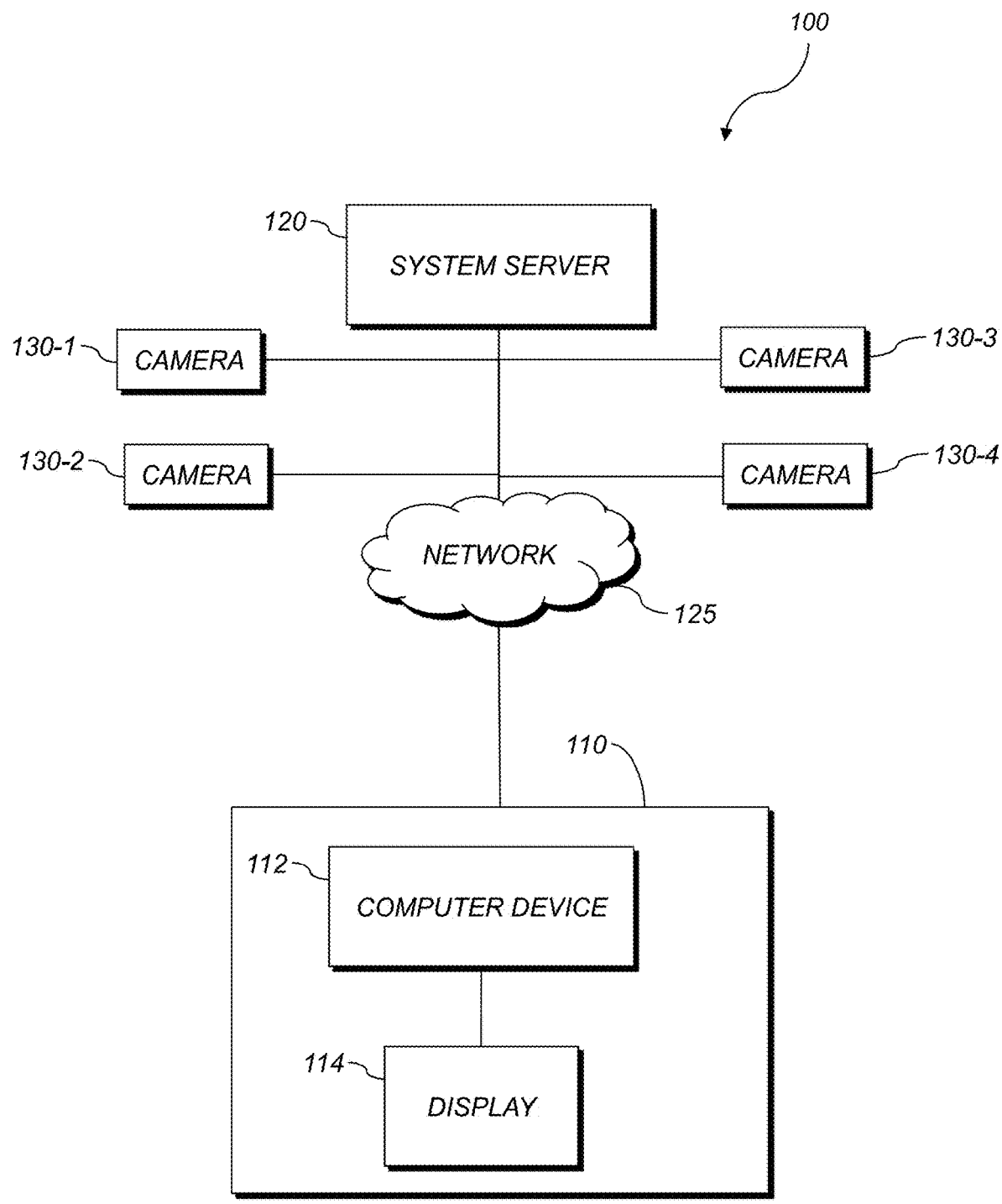
FIG. 1A depicts a system for managing remote display of video streams, according to one or more aspects of the present disclosure.

Many aspects of the invention can be better understood with reference to the above drawings. The elements and features shown in the drawings are not to scale, emphasis instead being placed upon clearly illustrating the principles of example embodiments of the present invention. Moreover, certain dimensions may be exaggerated to help visually convey such principles. In the drawings, reference numerals designate like or corresponding, but not necessarily identical, elements throughout the several views. Other features of the present embodiments will be apparent from the Detailed Description that follows.

DESCRIPTION

The present disclosure relates, in part, to methods of managing remote display of video streams. In a large facility, numerous video cameras may be deployed for monitoring equipment, providing general purpose security, or other such purposes. Especially when the number and complexity of a deployment increases, a need arises for automated discovery and configuration of all components of such a system. The systems may include servers, cameras, and video displays.

Conventional systems rely on a client computer or device that includes a human machine interface (HMI) for logging in, configuring, and using the client computer or device to display video streams, e.g., by outputting those video streams to attached monitors. Advantageously, the present disclosure obviates any need for an HMI by providing a secure method of automatic configuration of client devices when deployed in a system. As such, the systems, servers, and client devices of the present disclosure represent an advancement in the field of video monitoring and management, and include numerous practical applications in a variety of usage cases.

Applicant has discovered enhanced techniques for automated provisioning, management, configuration, and operation of video monitoring deployments, that advantageously allow for a significant speed increase when setting up such a system having especially large numbers of cameras and monitoring stations.

Generally stated, provided herein, in one or more embodiments, are systems and methods for provisioning, configuring, managing, and/or upgrading infrastructure that includes video displays, video cameras, and other equipment used for remote display of video streams. In one embodiment, the system includes a plurality of video cameras, a plurality of video monitoring devices and a provisioning server.

For instance, each video camera of the plurality of video cameras may be configured to send discovery requests and receive configuration requests. In addition, each video monitoring device can include a client device and at least one display. In such a case, the client device can make use of one or more hardware accelerated components to display one or more video streams. The client device may be configured to send discovery requests and receive configuration requests, e.g., to and from a centralized provisioning server.

Advantageously, such a configuration allows for video monitoring devices that do not include a human-machine interface, such as a keyboard or mouse. Instead, the system uses automated provisioning to ensure that the devices are operating in accordance to a set of configurations that are centrally stored, e.g., in a provisioning database.

The provisioning server is configured to perform a variety of provisioning functions relative to the video cameras, video display devices, and other components.

For example, the provisioning server can discover the plurality of video cameras by receiving the discovery requests from the plurality of video cameras. In such a case, the provisioning server will register the plurality of video cameras, including storing real time streaming protocol (RTSP) information of the plurality of video cameras in the provisioning database. The provisioning server may also communicate with the plurality of video monitoring devices using public and private encryption keys to ensure security of the system and prevent unauthorized configuration changes. The provisioning server can then discover the plurality of video monitoring devices by receiving the discovery requests from the client device of each video monitoring device. After discovery, the provisioning server can register the plurality of video monitoring devices, the registering including storing display capabilities of the plurality of video monitoring devices in the provisioning database and using a license file stored in the provisioning database.

In another example, a provisioning portal is provided, allowing for centralized management, provisioning, control, and configuration of the system and all its components. For example, the provisioning portal includes a graphical user interface for receiving provisioning instructions including assignments of the plurality of video cameras to the plurality of video monitoring devices. Then, the provisioning portal stores the received provisioning instructions in the provisioning database. This arrangement allows the provisioning server to automatically reconfigure, responsive to the received provisioning instructions, the plurality of video monitoring devices to display outputs of selected cameras of the plurality of cameras on the at least one display of each of the plurality of video monitoring devices. In one specific example, the reconfiguring includes sending extensible markup language (XML) instructions to the plurality of video monitoring devices. Similarly, the provisioning server may upgrade software of each of the plurality of video monitoring devices, e.g., in order to make sure that all devices are operating in a desired manner and with the correct firmware and settings.

FIG. 1A depicts an environment 100 with a system server 120 that may be used for management and provisioning of numerous cameras, such as cameras 130-1-130-4. The system server 120 may include components such as those described in FIG. 3, and may run, for example, JavaScript. The cameras 130-1-130-4 can be any network capable camera, and may output video streams using Real Time Streaming Protocol (RTSP). As depicted in FIG. 1A, the server 120 communicates to client device(s) 110 through a network 125. The network may be any communications network, such as an internet protocol (IP) network.

The client device 110 includes a computer device 112 and at least one display 114. For instance, the computer device 112 may have the architecture depicted in FIG. 3. In one specific example, computer device 112 may be a Raspberry Pi single board computer running a purpose-built version of the Linux operating system.

Figure 1B:
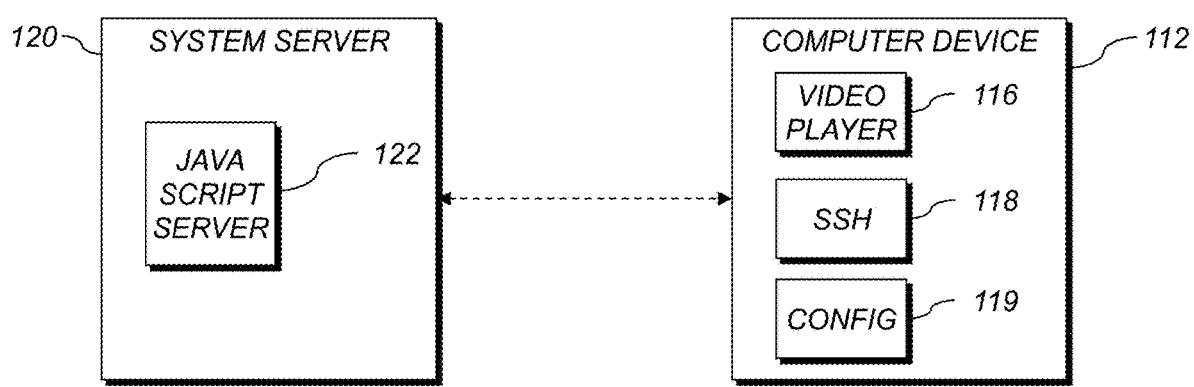
FIG. 1B depicts a server and a viewer device for managing remote display of video streams, according to one or more aspects of the present disclosure.

Turning next to FIG. 1B, further details of system server 120 and the computer device 112 are depicted. For instance, the system server 120 may include a JavaScript server 122. And, the computer device 112 may include various software and/or hardware components, such as a hardware accelerated video player 116, a secure shell (SSH) 118, and a configuration engine 119. In one example, the hardware accelerated video player 116 may use onboard hardware acceleration to output, e.g., H.264 standard video streams to the display 114 (FIG. 1A). For instance, video encoded in H.264 compression technology can be streamed directly from a camera to the client over Real Time Streaming Protocol (RTSP). An Open Media Acceleration (OMX) open source media player can use hardware acceleration support in, for example, a Raspberry Pi single board computer to decode and show H.264 video. In such a case, decoding of video is hardware accelerated hence there will be no lag with real time video. In addition, any compatible hardware decoding or accelerated video stream may be used instead of H.264.

Figure 2A:
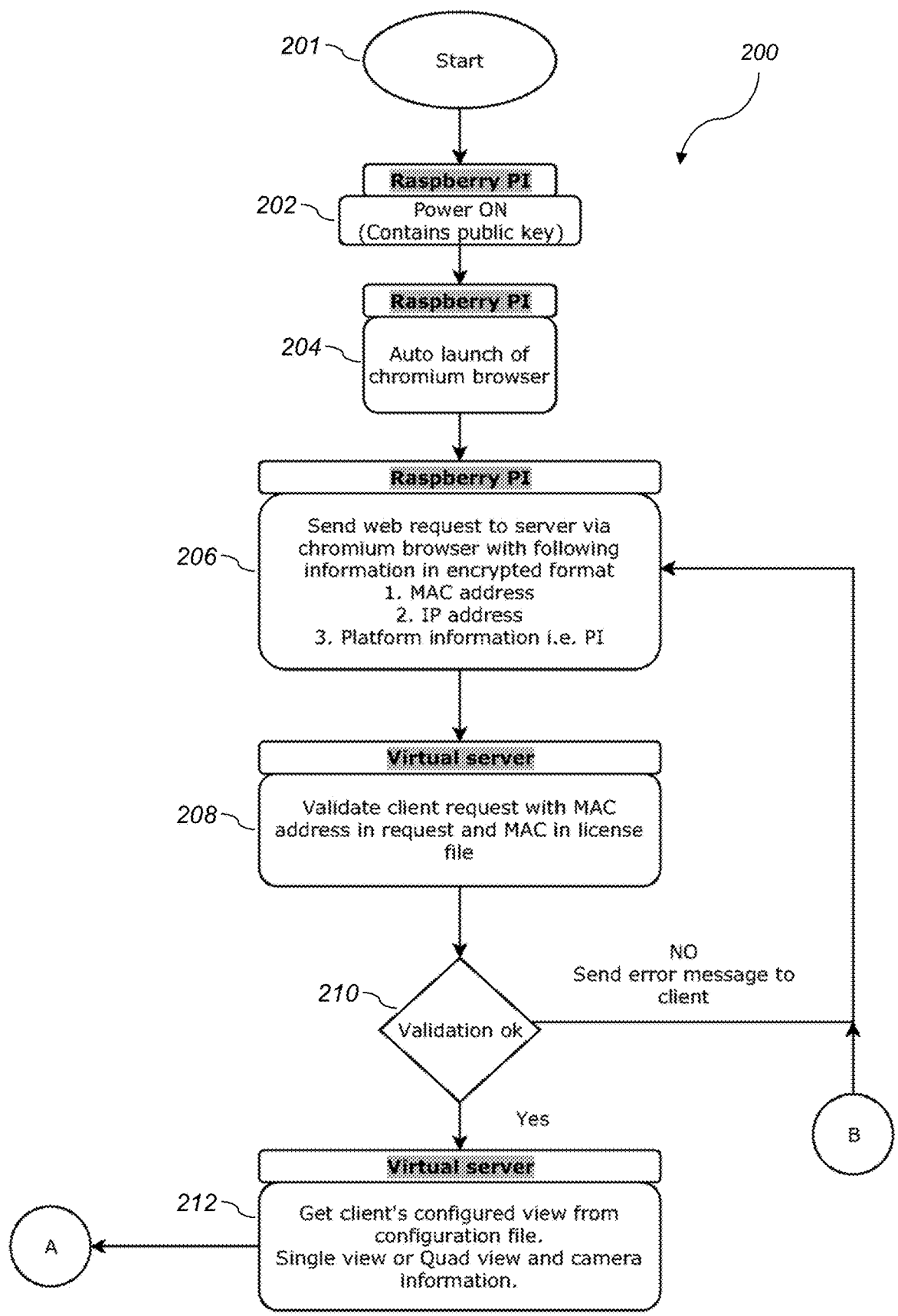
FIGS. 2A-2C are flow charts depicting embodiments of a method managing remote display of video streams, according to one or more aspects of the present disclosure.
Figure 2B:
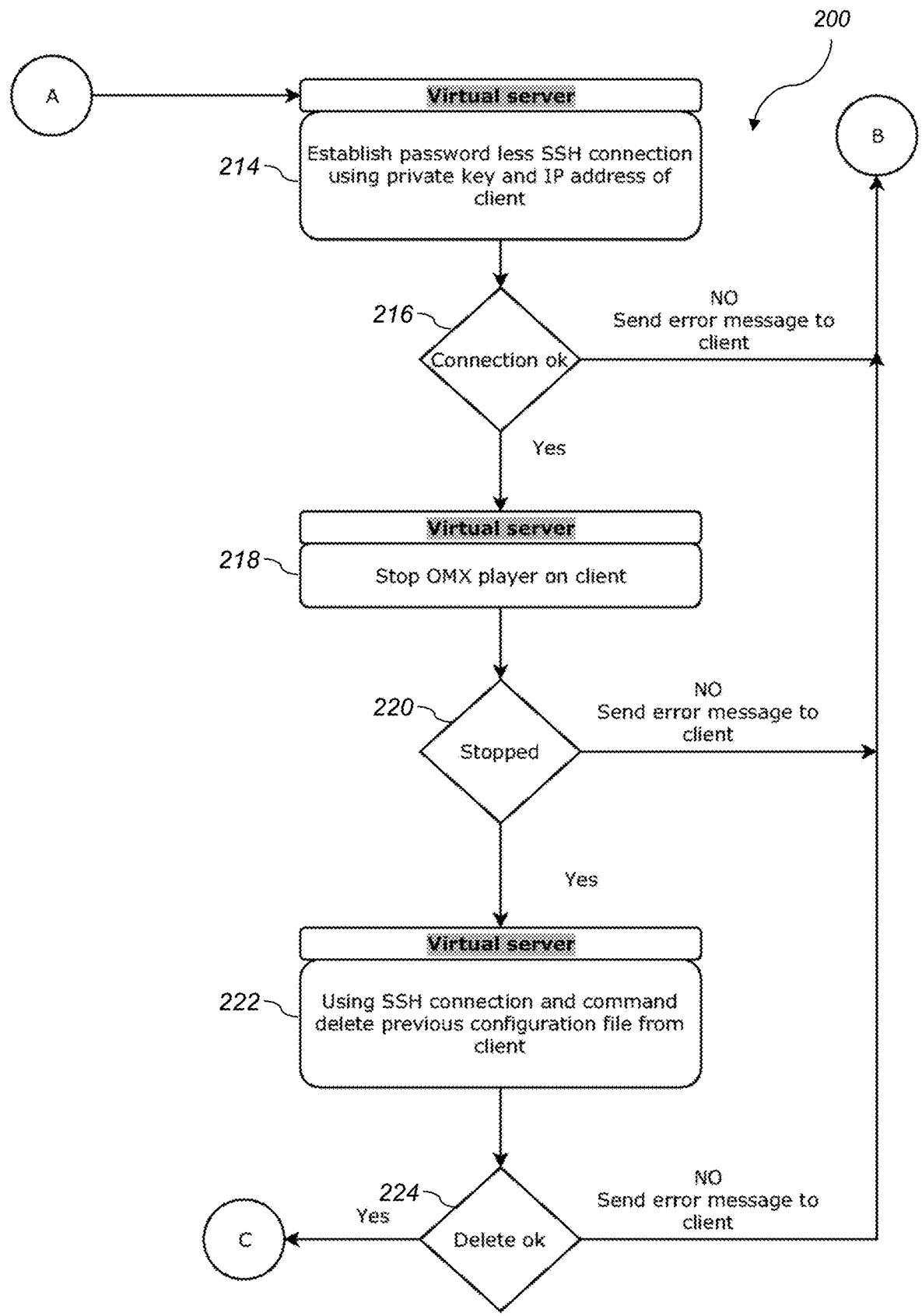
Figure 2C:
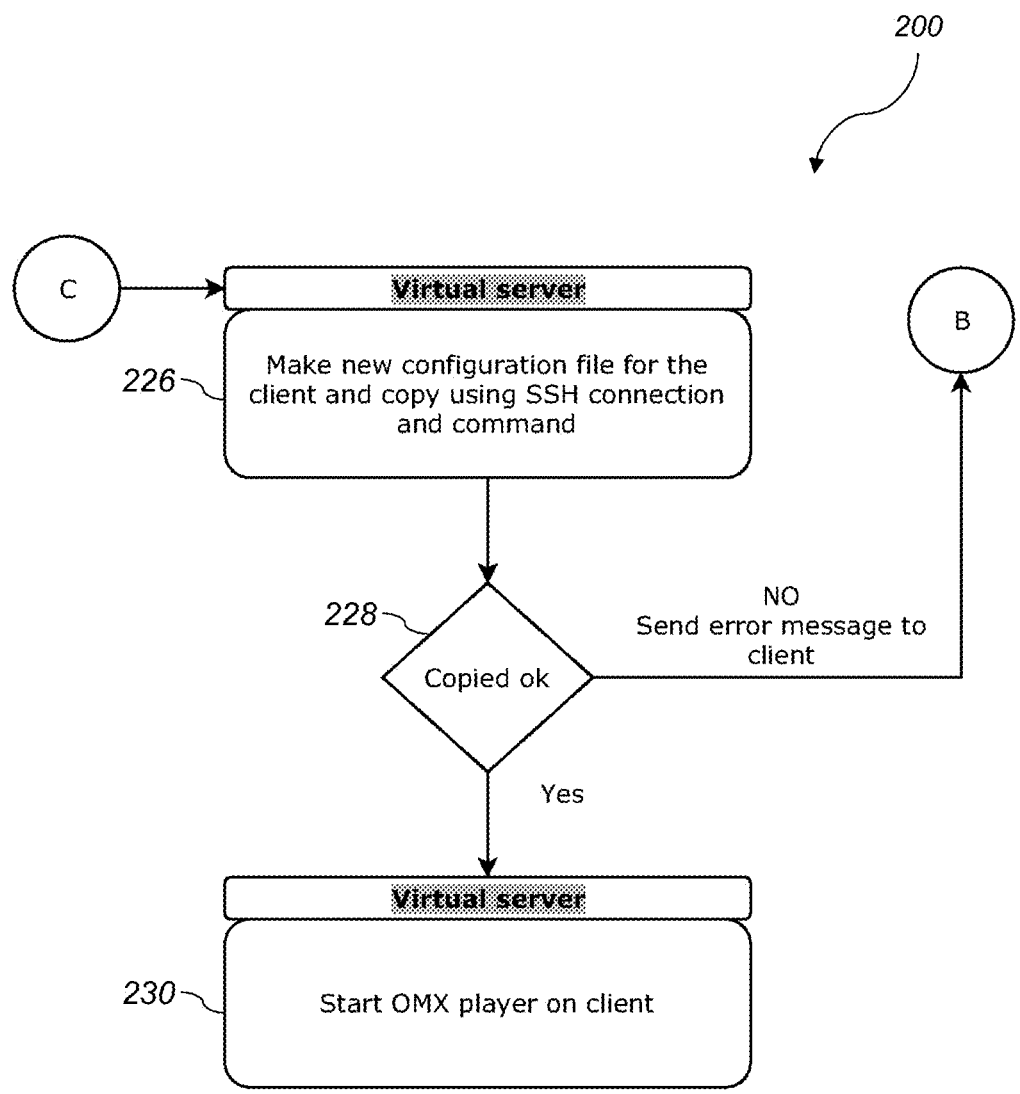

By way of example, FIGS. 2A-2C are flow charts depicting embodiments of a method managing remote display of video streams. In the flow charts of FIGS. 2A-2C, the blocks may include a header indicating which device or virtual device is in charge of performing the function. For the purposes of example, the Raspberry Pi header is indicative that any single board computer or equivalent computer device 112 could be used, and virtual server is indicative that any scripting server such as a JavaScript server 122 could be used. In other examples, any device that can be considered equivalent to the Raspberry Pi in terms of connectivity and hardware accelerated decoding options, could be used. For example, mobile phones, tablets, and the like could be usable, with included accelerated video decode on the platform.

In an embodiment, the method 200 starts at block 201. The method 200 at block 202 powers on the single board computer, which has been provisioned with a public key portion of a public/private encryption key. Next, the method 200 at block 204 automatically launches a browser, such as the Chromium browser. Then, the method 200 at block 206 sends a request to the server via the browser. In one example, the request includes unique identifying information such as a Media Access Control (MAC) address of the single board computer and/or an IP address. Other information, such as a platform information (PI) may also be sent.

In one specific example, a web request contains three data items in encrypted format. These include MAC address, Internet Protocol (IP) address and platform information about the client. On successful validation of a client via MAC address, the subsequent IP address will be used for discovering and controlling the client. The platform information will identify "pi" in case of Raspberry Pi, and could be different based on type of client, such as Android, iPhone, PC, and the like. In these cases, clients could be controlled in different manner as per the platform capabilities. In addition, the CPU ID is a unique identifier that could be used. In any case, any identifier that is unique for the device could be used, keeping in mind that certain identifiers, such as the IP address, is software defined and may be easily spoofed.

On the server side, the method 200 at block 208 receives and validates the client request. For instance, a configuration/license file stored or accessible on the server can be used to perform MAC level validation. Then, if the validation is OK at block 210, the method proceeds to block 212. Otherwise, the method returns to block 206 after sending an error message to the client. Next, at block 212, the server determines what view(s) the client will have of which specific cameras. The method then proceeds to block A.

In one specific working example, to determine the view(s), the server presents a web page through which the client can be configured for single or quad view. In such a case, configuration outputs are extensible markup language (XML) files present on the server and there will be one to one mapping between XML file and client. Continuing with this example, on the server receiving a client request, which XML file to read will be determined by a license file as there is one to one mapping between MAC and client file name. This configuration will be read and a new XML file compatible for the client will be created which is platform specific. These XML files are then used for further processing. Configuration can be changed when the client is up/running/showing the videos and the change will be reflected automatically on the client. For example, changes from single view to quad view or camera change in single/quad view will be reflected automatically.

Continuing with FIG. 2B, the method 200 at block 214 establishes an SSH connection using the private key of the public/private key pair mentioned above. The connection is then made to the client. At block 216, the connection is confirmed, and if not OK, the method proceeds to send an error message to the client and to block B.

Next, the method 200 at block 218 stops any video output on the client, by the server sending a message to that effect. For example, an OMX player may be stopped.

The method 200 at block 220 then confirms that the prior playback has been stopped, and if not, sends error message to the client and proceeds to block B.

The method 200 at block 222 then uses the SSH connection to delete a previous configuration file stored on the client. If the delete succeeds at block 224, the method proceeds to block C, otherwise the method sends an error message to the client and proceeds to block B.

Turning next to FIG. 2C, the method 200 at block 226 includes the server creating a new configuration file for the client and copying the file via the SSH connection to the client. If the copy succeeds at block 228, the method proceeds, otherwise the method sends an error message to the client and proceeds to block B.

The method at block 230 then starts the playback, using the new configuration file, on the client. For example, an OMX player, with hardware acceleration, may be started.

In one specific example, graphics processing unit (GPU) memory along with central processing unit (CPU) memories may be used for intensive tasks, e.g., H.264 video decoding, allowing for hardware acceleration. Advantageously, this configuration allows the use of specialized hardware located in supported devices, typically the GPU or CPU for fast and resource effective video rendering/encoding/decoding.

In another working example, when a client boots up the device can automatically launch a web browser and request a web page from the server. The web request can be predefined in the client. Then, the web request will be decrypted and validated on the web server, such as an Apache web server. Continuing with this implementation example, the server side will operate as follows. The server will contain private key and client will contain public key. After authentication, standalone java script code on the server will establish password-less SSH connection using, e.g., nodeSSH Client. On successfully connection establishment, the following commands will be executed sequentially which will control the client behavior.

sudo systemctl stop rpisury—stop OMX player sudo rm/uselocal/bin/rpisurv/conf/surveillance.yml—delete configuration file on client cat "+getYml Path(    )+pID+"yml"+"|ssh"+hpcUserName+"@"+hpcIpAddress+"'sudo cat>>/usr/local/bin/rpisurv/conf/surveillance.yml'—copy new configuration file on client.

sudo systemctl start rpisury—start OMX player

In other implementations, touch screens and keyboards could be deployed for the end user to provide feedback/input to the core system.

Figure 3:
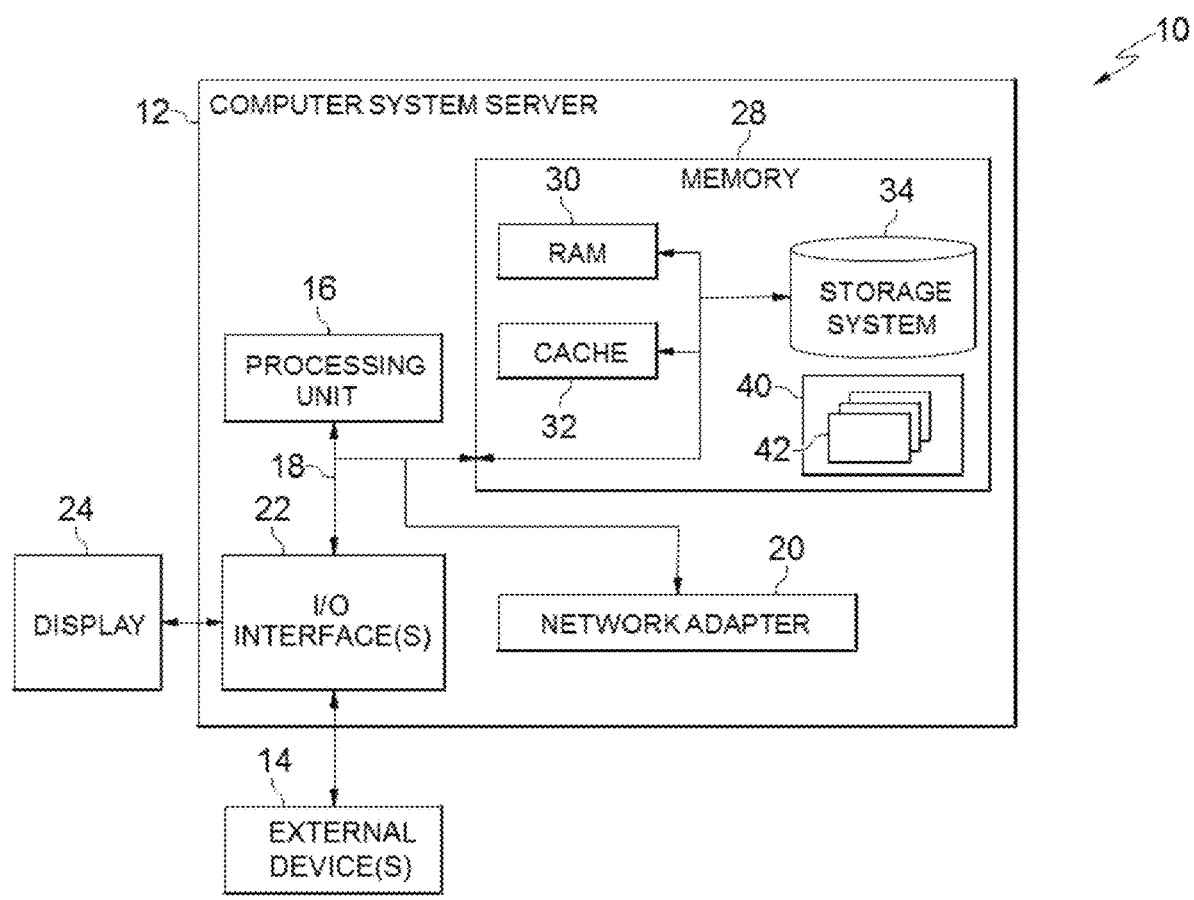
FIG. 3 is a block diagram of a computer system, such as that employed by components of the system of FIG. 1A, according to one or more aspects of the present disclosure.

FIG. 3 is a block diagram of a computer system 10, such as that employed by server 120 of FIG. 1A. A computer system/server 12 may be described in the general context of computer system-executable instructions, such as program modules, being executed by a computer system. Generally, program modules may include routines, programs, objects, components, logic, data structures, and so on that perform tasks or implement particular abstract data types. Computer system/server 12 may be practiced in distributed environments where tasks are performed by remote processing devices that are linked through a communications network. In a distributed environment, program modules may be located in both local and remote computer system storage media including memory storage devices.

Computer system/server 12 in computer system 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Embodiments may include a system, a method, and/or a computer program product. The computer program product may include a computer readable storage medium (or media) having computer readable program instructions thereon for causing a processor to carry out aspects of set forth herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the certain embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform certain aspects as set forth herein.

Embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create a means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "invention," "the invention," "this invention," and "the present invention," as used herein, intend to refer broadly to all disclosed subject matter and teaching, and recitations containing these terms should not be misconstrued as limiting the subject matter taught herein or to limit the meaning or scope of the claims. From the description of the example embodiments, equivalents of the elements shown therein will suggest themselves to those skilled in the art, and ways of constructing other embodiments of the present invention will appear to practitioners of the art. Therefore, the scope of the present invention is to be limited only by the claims that follow.

What is claimed is:

1. A system for provisioning remote display of video streams, the system comprising:
    a plurality of video cameras, each video camera of the plurality of video cameras configured to send discovery requests and receive configuration requests;
    a plurality of video monitoring devices, each video monitoring device comprising a client device and at least one display, the client device comprising a browser application and a video player application, the client device being configured to send discovery requests via the browser application and receive configuration requests, wherein the discovery requests from the client device each comprise a MAC address, an IP address, and platform information about the client device; and
    a provisioning server comprising a provisioning database, the provisioning server configured to:
        discover the plurality of video cameras by receiving the discovery requests from the plurality of video cameras;
        register the plurality of video cameras, the registering comprising storing real time streaming protocol (RTSP) information of the plurality of video cameras in the provisioning database;

discover the plurality of video monitoring devices by receiving the discovery requests from the browser application of the client device of each video monitoring device;
register the plurality of video monitoring devices, the registering comprising storing display capabilities of the plurality of video monitoring devices in the provisioning database;
provide a provisioning portal, the provisioning portal including a graphical user interface for receiving provisioning instructions comprising assignments of the plurality of video cameras to the plurality of video monitoring devices, wherein the provisioning portal stores the received provisioning instructions in the provisioning database; and
reconfigure, responsive to the received provisioning instructions, the plurality of video monitoring devices to display outputs of selected cameras of the plurality of cameras on the at least one display of each of the plurality of video monitoring devices, the reconfiguring comprising sending a corresponding message to control the video player application of the client device of each video monitoring device.

2. The system of claim 1, wherein the provisioning server communicates with the plurality of video monitoring devices using public and private encryption keys.

3. The system of claim 1, wherein the provisioning server reconfigures the plurality of video monitoring devices using extensible markup language (XML) instructions.

4. The system of claim 1, wherein the provisioning server is further configured to upgrade software of each of the plurality of video monitoring devices.

5. The system of claim 1, wherein the plurality of video monitoring devices do not include a human-machine interface.

6. The system of claim 1, wherein the provisioning server registers the plurality of video monitoring devices using a license file stored in the provisioning database.

7. The system of claim 1, wherein the plurality of video monitoring devices use a hardware accelerated component to display one or more video streams.

8. The system of claim 1, wherein the provisioning server is further configured to:
validate the discovery requests using the MAC addresses of the client device of each video monitoring device.

9. A system for provisioning remote display of video streams, the system comprising:
a plurality of video cameras, each video camera of the plurality of video cameras configured to send discovery requests and receive configuration requests;
a plurality of video monitoring devices, each video monitoring device comprising a client device and at least one display, the client device comprising a hardware accelerated component to display one or more video streams, a browser application, and a video player application, wherein the client device is configured to send discovery requests via the browser application and receive configuration requests, wherein the discovery requests each comprise a MAC address, an IP address, and platform information about the client, wherein the plurality of video monitoring devices do not include a human-machine interface; and
a provisioning server comprising a provisioning database, the provisioning server configured to:
discover the plurality of video cameras by receiving the discovery requests from the plurality of video cameras;
register the plurality of video cameras, the registering comprising storing real time streaming protocol (RTSP) information of the plurality of video cameras in the provisioning database;
communicate with the plurality of video monitoring devices using public and private encryption keys;
discover the plurality of video monitoring devices by receiving the discovery requests from the browser application of the client device of each video monitoring device;
register the plurality of video monitoring devices, the registering comprising storing display capabilities of the plurality of video monitoring devices in the provisioning database and using a license file stored in the provisioning database;
provide a provisioning portal, the provisioning portal including a graphical user interface for receiving provisioning instructions comprising assignments of the plurality of video cameras to the plurality of video monitoring devices, wherein the provisioning portal stores the received provisioning instructions in the provisioning database;
reconfigure, responsive to the received provisioning instructions, the plurality of video monitoring devices to display outputs of selected cameras of the plurality of cameras on the at least one display of each of the plurality of video monitoring devices, the reconfiguring comprising sending extensible markup language (XML) instructions to the plurality of video monitoring devices; and
upgrade software of each of the plurality of video monitoring devices.

10. A method for provisioning remote display of video streams using a plurality of video cameras and a plurality of video monitoring devices, each video monitoring device comprising a client device and at least one display, the client device comprising a browser application and a video player application, the method comprising:
discovering the plurality of video cameras by receiving discovery requests from the plurality of video cameras, wherein the discovery requests each comprise a MAC address, an IP address, and platform information about the client device;
registering the plurality of video cameras, the registering comprising storing real time streaming protocol (RTSP) information of the plurality of video cameras in a provisioning database;
discovering the plurality of video monitoring devices by receiving discovery requests from the browser application of the client device of each video monitoring device;
registering the plurality of video monitoring devices, the registering comprising storing display capabilities of the plurality of video monitoring devices in the provisioning database;
providing a provisioning portal, the provisioning portal including a graphical user interface;
receiving, via the provisioning portal, provisioning instructions comprising assignments of the plurality of video cameras to the plurality of video monitoring devices;
storing the received provisioning instructions in the provisioning database; and
reconfiguring, responsive to the received provisioning instructions, the plurality of video monitoring devices to display outputs of selected cameras of the plurality of cameras on the at least one display of each of the plurality of video monitoring devices.

11. The method of claim 10, further comprising communicating with the plurality of video monitoring devices using public and private encryption keys.

12. The method of claim 10, further comprising reconfiguring the plurality of video monitoring devices using extensible markup language (XML) instructions.

13. The method of claim 10, further comprising upgrading software of each of the plurality of video monitoring devices.

14. The method of claim 10, wherein the plurality of video monitoring devices do not include a human-machine interface.

15. The method of claim 10, further comprising registering the plurality of video monitoring devices using a license file stored in the provisioning database.

16. The method of claim 10, further comprising using a hardware accelerated component to display one or more video streams.

* * * * *